BIS(ACYLCYCLOPENTADIENYL)IRON ENOL ESTERS

Roy L. Pruett, Tonawanda, N.Y., assignor to Union Carbide Corporation, a corporation of New York No Drawing. Filed Jan. 24, 1958, Ser. No. 710,855

4 Claims. (Cl. 260—439)

This invention relates to a novel class of organo-metallic compounds which are derivatives of bis(cyclopentadienyl)iron.

Derivatives of bis(cyclopentadienyl)iron such as bis-(acetylcyclopentadienyl)iron and bis($\beta$-chloropropionyl-cyclopentadienyl)iron have been known for some time. Certain derivatives of bis(acylcyclopentadienyl)iron such as the dioxime of bis(acetylcyclopentadienyl)iron have also been prepared. See, for example, Woodward et al., J. Am. Chem. Soc., 74, 3458, 1952.

I have now discovered a different class of compounds which are new and useful derivatives of bis(cyclopentadienyl)iron. The novel compounds have the general formula,

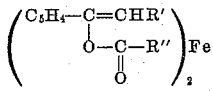

wherein R′ represents hydrogen or an alkyl group and R″ represents an alkyl, halogen-substituted alkyl, aryl or alkyl-substituted aryl group.

R′ may be any straight chain or branched chain alkyl group such as methyl, ethyl, propyl and iso-butyl. R″ may be an alkyl group or halogen-substituted alkyl group such as methyl, trifluoromethyl, ethyl, $\beta$-chloroethyl and iso-butyl, an aryl group such as phenyl or naphthyl, or an alkyl-substituted aryl group such as p-tolyl.

The compounds of this invention may therefore be characterized as enol esters of bis(acylcyclopentadienyl)irons represented by the formula

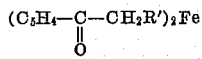

wherein R′ has the meaning described hereinabove.

Specific examples of the novel compounds of this invention are bis(acetylcyclopentadienyl)iron enol acetate, bis(propionylcyclopentadienyl)iron enol trifluoroacetate and bis(acetylcyclopentadienyl)iron enol benzoate.

The compounds of this invention may be produced by reacting a suitable bis(acylcyclopentadienyl)iron with an acylating or aroylating agent in the presence of a strong acid catalyst. The bis(acylcyclopentadienyl)iron may be prepared conveniently by the method of Wooward (J. Am. Chem. Soc., 74, 3458, 1952). The bis(acylcyclopentadienyl)iron may then be treated with a suitable acylating agent or aroylating agent in the presence of a strong acid. The acylating or aroylating agent may be an acid halide such as acetyl chloride, benzoyl chloride or $\beta$-chloropropionyl chloride, an acyl ester of an enolizable ketone such as isopropenyl acetate or an acid anhydride such as acetic anhydride, trifluoroacetic anhydride, $\beta$-chloropropionic anhydride or benzoic anhydride. The acid catalyst may be any strong acid such as sulfuric acid, trichloroacetic acid or p-toluene sulfonic acid.

The stoichiometry of the reaction calls for two moles of acylating or aroylating agent per mole of bis(acylcyclopentadienyl)iron, but it is preferable to use at least a 50% excess of acylating or aroylating agent, that is at least three moles per mole of bis(acylcyclopentadienyl)iron. The amount of acid catalyst used may vary from trace amounts to several percent by weight.

The reactants may be dissolved in an inert organic solvent such as benzene, chloroform, or tetrahydrofuran; but when the acylating agent or aroylating agent is itself a liquid, it is preferable to omit the inert solvent. The bis(acylcyclopentadienyl)irons useful in the present invention dissolve in the acylating and aroylating agents listed hereinabove.

The reaction between the bis(acylcyclopentadienyl)iron and the acylating or aroylating agent takes place slowly at room temperature. Therefore, it is preferable to heat the mixture to increase the rate of reaction. This may be conveniently done by heating the reaction mixture under reflux to the boiling point of the inert solvent or to the boiling point of the acylating or aroylating agent when no inert solvent is present.

Heating may be continued for about one to three hours. The reaction mixture may then be cooled and the excess acylating or aroylating agent neutralized by treating the reaction mixture with aqueous sodium bicarbonate or other weak base. The neutralized reaction mixture may then be extracted with an inert organic solvent such as ether or chloroform. The solution of the reaction product in the organic solvent may then be washed with water to remove the last traces of acylating or aroylating agent and then dried over anhydrous calcium chloride or anhydrous sodium sulfate. The solution may then be filtered to remove the drying agent and heated to evaporate the solvent. The last traces of solvent may be removed by heating under reduced pressure.

For example, 10 grams of bis(acetylcyclopentadienyl)-iron were placed in a flask fitted with a distillation column and were heated under reflux with 50 ml. of isopropenyl acetate and 0.3 ml. of concentrated sulfuric acid. About 5 ml. of acetone were removed at the head of the distillation column. After one hour the dark red liquid was cooled and poured into a mixture of cold, dilute, aqueous sodium bicarbonate and chloroform. The layers were separated and the chloroform layer washed with water, and finally dried over sodium sulfate. The chloroform solution was filtered and the filtrate was evaporated on a steam bath to give a dark red liquid. This liquid was heated at 100° C. and a pressure of less than 1 mm. mercury for 2 hours. Elemental analysis showed the product to be bis(acetylcyclopentadienyl)iron enol acetate, $FeC_{18}H_{18}O_4$.

|    | Analysis (Wt. Percent) | Theory for $FeC_{18}H_{18}O_4$ (Wt. Percent) |
|----|---|---|
| Fe | 18.4 | 15.8 |
| C  | 60.5 | 61.1 |
| H  | 5.2  | 5.1  |

The compounds of this invention are dark red liquids which are soluble in common organic solvents such as chloroform, benzene, toluene and di-ethyl ether. The compounds also undergo olefin polymerization as described in detail hereinbelow.

The compounds of this invention are useful because of their ability to impart anti-static properties to polymeric materials. The bis(acylcyclopentadienyl)iron enol esters of this invention can be copolymerized with such monomers as vinyl chloride, vinyl acetate and styrene. Alpha,-alpha-azobisisobutyronitrile is particularly useful as a catalyst for these copolymerizations. Peroxides are not recommended as they tend to cause undesirable side reactions with the organometallic compound. The copolymer may then be treated with a mild oxidizing agent such as ferric chloride, ceric sulfate or iodine, thereby oxidizing the iron near the surface of the copolymer from the divalent to the trivalent state. The presence of trivalent iron near the surface of the copolymer prevents the accumulation of a static charge.

For example, bis(acetylcyclopentadienyl)iron enol acetate was mixed with equal parts by weight of vinyl acetate and a catalytic amount of alpha,alpha-azobisisobutyronitrile was added. The mixture was heated to about 80° C. for 2 hours. The resulting polymer was treated with aqueous ferric chloride to give a product which was resistant to the accumulation of a static charge.

What is claimed is:

1. As compositions of matter the organometallic compounds having the formula $$\left( \begin{array}{c} C_5H_4-C=CHR' \\ | \\ O-C-R'' \\ \parallel \\ O \end{array} \right)_2 Fe$$

wherein R' is a group selected from the class consisting of hydrogen and lower alkyl, and R'' is a group selected from the class consisting of lower alkyl, halogen-substituted lower alkyl, phenyl, lower alkylphenyl and naphthyl.

2. Bis(acetylcyclopentadienyl)iron enol acetate.
3. Bis(acetylcyclopentadienyl)iron enol benzoate.
4. Bis(propionylcyclopentadienyl)iron enol trifluoroacetate.

No references cited.